(12) United States Patent
Walker et al.

(10) Patent No.: US 9,961,182 B2
(45) Date of Patent: May 1, 2018

(54) COMMUNICATIONS SYSTEM PROVIDING DATA TRANSFER USING SELECTIVE WIRELESS COMMUNICATIONS FORMATS AND RELATED METHODS

(75) Inventors: David Ryan Walker, Waterloo (CA); Vahid Moosavi, Kitchener (CA)

(73) Assignee: BLACKBERRY LIMITED, Waterloo (CA)

(*) Notice: Subject to any disclaimer, the term of this patent is extended or adjusted under 35 U.S.C. 154(b) by 923 days.

(21) Appl. No.: 13/037,002

(22) Filed: Feb. 28, 2011

(65) Prior Publication Data
US 2012/0077433 A1   Mar. 29, 2012

Related U.S. Application Data

(60) Provisional application No. 61/385,734, filed on Sep. 23, 2010.

(51) Int. Cl.
*H04B 5/00* (2006.01)
*H04M 1/725* (2006.01)
(Continued)

(52) U.S. Cl.
CPC .......... *H04M 1/7253* (2013.01); *H04L 69/14* (2013.01); *H04L 69/18* (2013.01); *H04W 4/008* (2013.01);
(Continued)

(58) Field of Classification Search
USPC ............................................. 455/41.1, 41.2
See application file for complete search history.

(56) References Cited

U.S. PATENT DOCUMENTS

2004/0177078 A1* 9/2004 Haase ............... G06F 17/30592
2006/0072551 A1* 4/2006 Aoyama ................. H04L 29/06
                                                                370/352
(Continued)

FOREIGN PATENT DOCUMENTS

WO   WO2008/021032   2/2008
WO   2009105115      8/2009
(Continued)

OTHER PUBLICATIONS

U.S. Appl. No. 13/027,029, filed Feb. 14, 2011, Byrne et al.
(Continued)

*Primary Examiner* — Nay A Maung
*Assistant Examiner* — Erica Fleming-Hall
(74) *Attorney, Agent, or Firm* — Guntin & Gust, PLC; Ralph Trementozzi

(57) ABSTRACT

A communications system may include a plurality of electronic devices each configured to wirelessly communicate via an NFC format and another wireless communications format(s). A first electronic device may have an NFC transfer parameter associated therewith, and may be configured to establish an NFC link with a second electronic device of the plurality of electronic devices when in proximity therewith, designate data to be transferred to the second electronic device, and determine whether the designated data complies with the NFC transfer parameter. Based on a determination that the designated data complies with the NFC transfer parameter, the first electronic device may be configured to transfer at least some of the designated data via the NFC link, and otherwise transfer at least some of the designated data to the second electronic device over a separate wireless communications link using the at least one other wireless communications format.

24 Claims, 3 Drawing Sheets

(51) Int. Cl.
*H04W 4/00* (2018.01)
*H04L 29/06* (2006.01)
*H04W 88/06* (2009.01)

(52) U.S. Cl.
CPC ........ *H04M 2250/04* (2013.01); *H04W 88/06* (2013.01)

(56) References Cited

U.S. PATENT DOCUMENTS

| | | | |
|---|---|---|---|
| 2006/0155578 A1* | 7/2006 | Eisenberger | G06F 19/322 705/2 |
| 2007/0239981 A1* | 10/2007 | Lessing | 713/164 |
| 2008/0218196 A1* | 9/2008 | Eckhart | 326/8 |
| 2008/0238610 A1* | 10/2008 | Rosenberg | 340/5.7 |
| 2009/0034731 A1* | 2/2009 | Oshima | 380/270 |
| 2009/0051498 A1* | 2/2009 | Otranen | 340/10.4 |
| 2009/0066998 A1* | 3/2009 | Kato | 358/1.15 |
| 2009/0111378 A1* | 4/2009 | Sheynman et al. | 455/41.1 |
| 2009/0298426 A1* | 12/2009 | Helvick | 455/41.1 |
| 2010/0184372 A1* | 7/2010 | Tabaaloute | 455/41.1 |
| 2010/0328225 A1* | 12/2010 | Black | 345/173 |
| 2010/0332304 A1* | 12/2010 | Higgins | G06Q 30/02 705/14.16 |
| 2011/0291834 A1* | 12/2011 | Boldyrev | G06F 12/1416 340/572.1 |
| 2011/0319016 A1* | 12/2011 | Gormley et al. | 455/41.1 |
| 2012/0021682 A1* | 1/2012 | Tabaaloute | 455/41.1 |
| 2012/0069772 A1 | 3/2012 | Bryne et al. | |
| 2012/0077432 A1 | 3/2012 | Rose et al. | |
| 2012/0214413 A1 | 8/2012 | Rose et al. | |
| 2012/0231735 A1* | 9/2012 | Takayama et al. | 455/41.1 |
| 2013/0035035 A1* | 2/2013 | Fisher | 455/41.1 |

FOREIGN PATENT DOCUMENTS

| | | | |
|---|---|---|---|
| WO | WO2010/077194 | 7/2010 | G06F 17/30 |
| WO | WO2010/089458 | 8/2010 | G06F 9/46 |

OTHER PUBLICATIONS

U.S. Appl. No. 12/888,642, filed Sep. 23, 2010, Rose et al.

Pering et al. "*Gesture Connect: Facilitating Tangible Interaction With a Flick of the Wrist*" http://www.cs.washington.edu/homes/yanokwa/resources/anokwa_gestureconnect.pdf.

"Office Action", CA Patent Application 2,812,210, Title: Communications System Providing Data Transfer Using Selective Wireless Communications Formats and Related Methods, dated May 27, 2016.

* cited by examiner

COMMUNICATIONS SYSTEM PROVIDING DATA TRANSFER USING SELECTIVE WIRELESS COMMUNICATIONS FORMATS AND RELATED METHODS

RELATED APPLICATIONS

This application is based upon prior filed provisional application Ser. No. 61/385,734 filed Sep. 23, 2010, the disclosure of which is incorporated herein by reference in its entirety.

TECHNICAL FIELD

This application relates to the field of wireless communications, and more particularly, to wireless communications devices and related methods.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the Internet via a cellular network and/or a wireless local area network (WAN), for example.

Some mobile devices incorporate contactless card technology and/or near-field communication (NFC) chips. NFC technology is used for contactless short-range communications based on radio frequency identification (RFID) standards, using magnetic field induction to enable communication between electronic devices, including mobile wireless communications devices. These short-range communications include payment and ticketing, electronic keys, identification, device set-up service and similar information sharing. This short-range high frequency wireless communications technology exchanges data between devices over a short distance, such as only a few centimeters.

DETAILED DESCRIPTION

Figure 1:
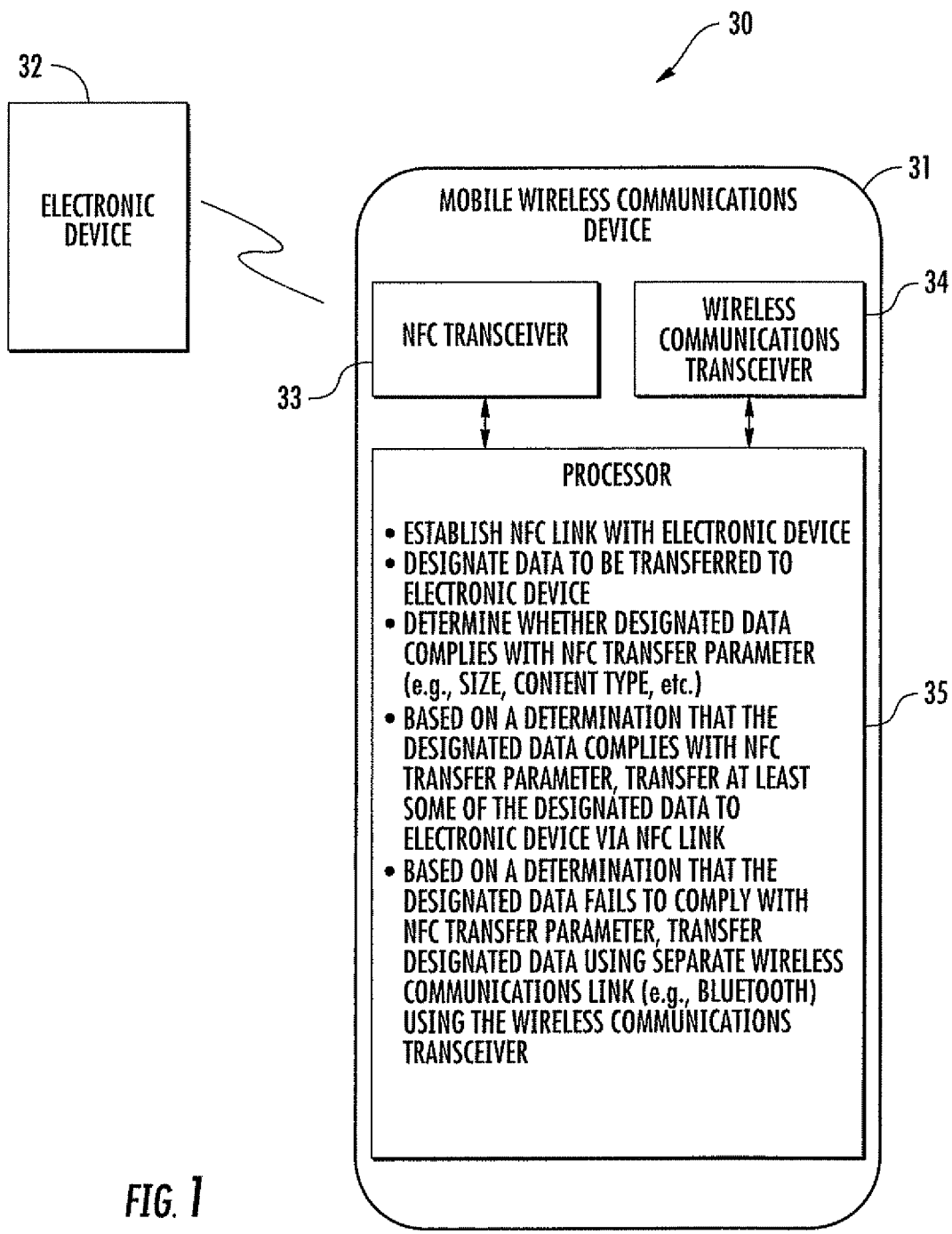
FIG. 1 is a schematic block diagram of a communications system in accordance with one example aspect.

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete.

Generally speaking, a communications system is provided herein which may include a plurality of electronic devices each configured to wirelessly communicate via a near-field communication (NFC) format and at least one other wireless communications format. A first electronic device of the plurality thereof may have an NFC transfer parameter associated therewith, and the first electronic device may be configured to establish an NFC link with a second electronic device of the plurality of electronic devices when in proximity therewith, designate data to be transferred to the second electronic device, and determine whether the designated data complies with the NFC transfer parameter. Based on a determination that the designated data complies with the NFC transfer parameter, the first electronic device may be configured to transfer at least some of the designated data to the second electronic device via the NFC link. Based on a determination that the designated data fails to comply with the NFC transfer parameter, the first electronic device may be configured to transfer at least some of the designated data to the second electronic device over a separate wireless communications link using the at least one other wireless communications format. This advantageously allows the first electronic device to determine the appropriate wireless communications format for the designated data and provide enhanced data transfer and convenience, for example.

By way of example, the first electronic device may be configured to determine whether the designated data complies with the NFC transfer parameter based upon a size of the designated data. In accordance with another example, the designated data may have a given content type associated therewith from among a plurality of different content types, and the first electronic device may be configured to determine whether the designated data complies with the NFC transfer parameter based upon the given content type of the designated data. In another example embodiment, the designated data may have a security level or a sensitivity level associated therewith (e.g. public information, confidential, strictly confidential, etc.), and the first electronic device may be configured to determine whether the designated data complies with the NFC transfer parameter based upon the security level or the sensitivity level of the designated data. For example, designated data having a sensitivity level of public may be transferred via the NFC link, and designated data having a sensitivity level of confidential may be transferred via the other wireless communications format which may be more suitable for transferring confidential data (for example, due to the more secure nature of the other wireless communications format). The at least one other wireless communications format may comprise any one of a Bluetooth format, a WiFi format (IEEE 802.11), an Infrared (IrDA) format and a ZigBee format (IEEE 802.15.4) for example.

More particularly, the first electronic device may include a processor and an output device coupled thereto, and the designated data may be designated based upon data output via said output device. By way of example, the designated data may comprise at least one of audio data, image data, video data, markup language data, Internet address data, text data, contact data, calendar data, message data, etc. The first electronic device may comprise a mobile wireless communications device, for example. Also, the first electronic device may be configured to exchange connection data over the NFC link for establishing the separate wireless communications link with the second electronic device using the at least one other wireless communications format. More particularly, the first electronic device may be configured to exchange the connection data based upon the designated data not complying with the NFC transfer parameter.

A related mobile wireless communications device is also provided for use with an electronic device configured to wirelessly communicate via an NFC format and at least one other wireless communications format. The mobile wireless communications device may include an NFC transceiver, a wireless communications transceiver configured to communicate using the at least one other wireless communications format, and a processor coupled to the NFC transceiver and the wireless communications transceiver. The processor may be configured to cause the NFC transceiver to establish an NFC link with the electronic device when in proximity therewith, designate data to be transferred to the electronic device, and determine whether the designated data complies with an NFC transfer parameter. Based on a determination that the designated data complies with the NFC transfer parameter, the processor may be configured to transfer at least some of the designated data to the electronic device via the NFC link. Based on a determination that the designated data fails to comply with the NFC transfer parameter, the processor may be configured to transfer the designated data to the electronic device over a separate wireless communications link with the electronic device using the at least one other wireless communications format.

A related communications method is for a plurality of electronic devices each configured to wirelessly communicate via an NFC format and at least one other wireless communications format. The method may include establishing an NFC link between first and second electronic devices of the plurality of electronic devices when in proximity with one another, and designating data to be transferred from the first electronic device to the second electronic device, where the first electronic device may have an NFC transfer parameter associated therewith. The method may further include determining, at the first electronic device, whether the designated data complies with the NFC transfer parameter. Based on a determination that the designated data complies with the NFC transfer parameter, at least some of the designated data may be transferred from the first electronic device to the second electronic device via the NFC link. Based on a determination that the designated data fails to comply with the NFC transfer parameter, the designated data may be transferred to the second electronic device over a separate wireless communications link with the second electronic device using the at least one other wireless communications format.

A related computer-readable medium for a mobile wireless communications device comprising an NFC transceiver and a wireless communications transceiver configured to communicate using at least one other wireless communications format is also provided. The computer-readable medium may have computer-executable instructions for causing the mobile wireless communications device to perform steps comprising causing the NFC transceiver to establish an NFC link with an electronic device also configured to communicate via NFC and the at least one other wireless communications format when in proximity therewith, designating data to be transferred to the electronic device, and determining whether the designated data complies with an NFC transfer parameter. Based on a determination that the designated data complies with the NFC transfer parameter, at least some of the designated data may be transferred to the electronic device via the NFC link. Based on a determination that the designated data fails to comply with the NFC transfer parameter, the designated data may be transferred to the electronic device over a separate wireless communications link with the electronic device using the at least one other wireless communications format.

Figure 2:
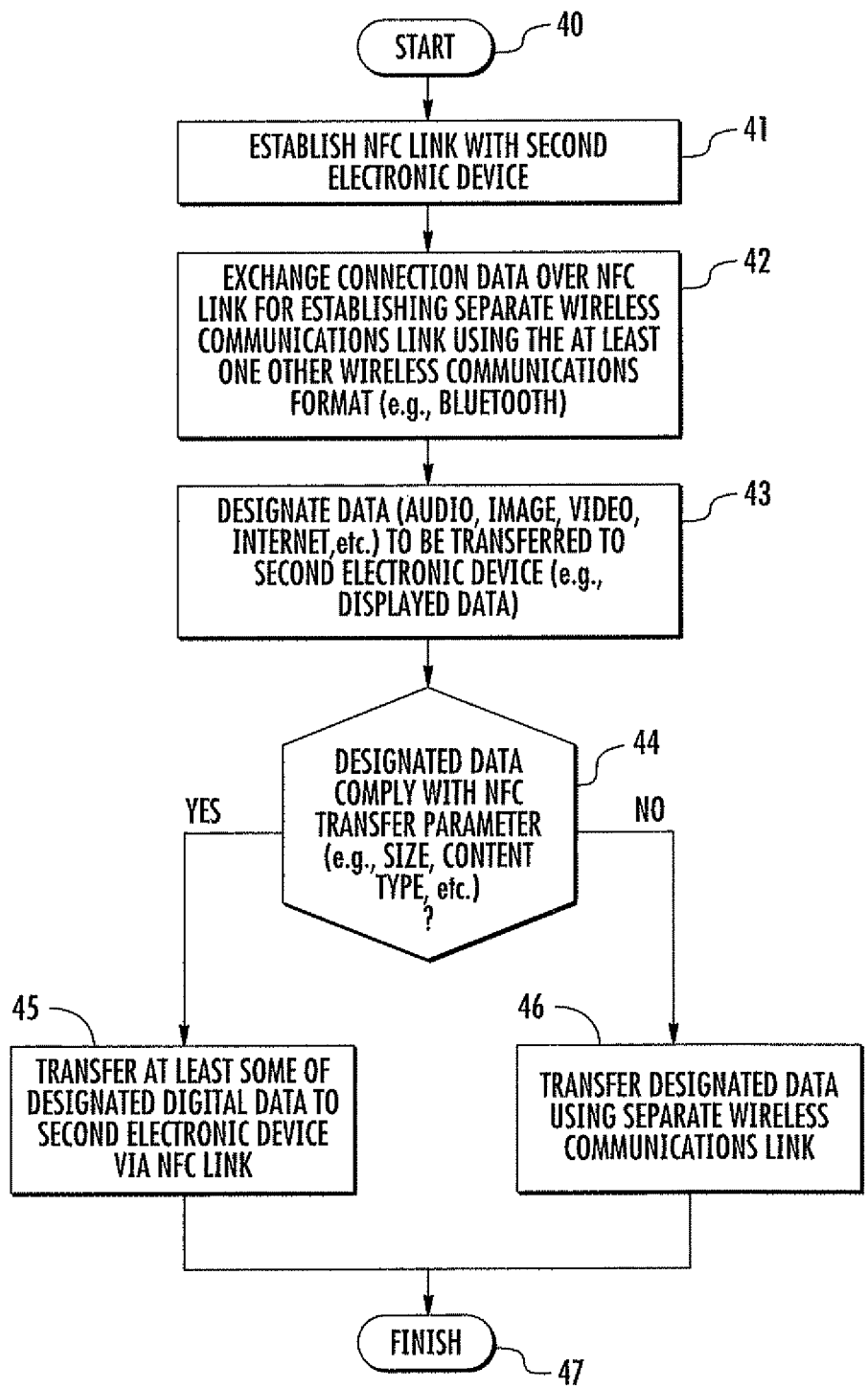
FIG. 2 is a flow diagram illustrating method aspects associated with the communications system of FIG. 1.

Referring initially to FIGS. 1 and 2, a communications system 30 and related method aspects are first described. The system 30 illustratively includes a plurality of electronic devices 31, 32 each configured to wirelessly communicate via a near-field communication (NFC) format and at least one other wireless communications format, standard, or protocol. In the illustrated example, the first electronic device 31 is a mobile wireless communications device which illustratively includes an NFC transceiver 33 and a wireless communications transceiver 34. For the present example, the wireless communications transceiver 34 will be considered a Bluetooth transceiver, although other suitable communications formats (e.g., wireless local area network (WLAN) or WiFi (IEEE 802.11), WiMAX (Worldwide Interoperability for Microwave Access and IEEE 802.16), cellular, Infrared (IrDA), ZigBee (IEEE 802.15.4), etc.) may also be used in some example embodiments. The mobile wireless communications device 31 further illustratively includes a processor 35 coupled with the NFC transceiver 33 and the wireless communications transceiver 34. By way of example, the processor 35 may be implemented using a combination of hardware (e.g., microprocessor) and software, namely a computer-readable medium having computer-executable instructions for performing the various operations or functions described herein.

Beginning at Block 40, the mobile wireless communications device 31 may establish an NFC link with the electronic device 32 when in proximity (e.g., NFC communication range) therewith, at Block 41. By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of about 10 cm, but other suitable versions of near-field communication which may have different operating frequencies, effective ranges, etc., for example, may also be used.

Example types of mobile wireless communications devices 31 may include portable or personal media players (e.g., MP3 players, video players, etc.), remote controls (e.g., television or stereo remotes, etc.), portable gaming devices, portable or mobile telephones, smartphones, tablet computers, etc. More generally, other example electronic devices may include media (e.g., video, audio, etc.) players, displays, gaming consoles, telephones, point-of-sale (POS) terminals, computers, etc. In some embodiments the electronic device 32 may be a mobile wireless communications device as well, but it need not be in all embodiments.

The mobile wireless communication device 31 may have an NFC transfer parameter associated therewith. That is, the NFC transfer parameter is used to determine which data may be transferred via an NFC communications link, which has a relatively low data transfer rate or bandwidth, and which data should be transferred via a separate wireless communication link utilizing the other wireless communications format (e.g., Bluetooth), which typically will have a higher bandwidth or data transfer rate than NFC. The processor 35 is configured to exchange connection data over the NFC link for establishing a separate wireless communications link using the other wireless communications format (e.g., Bluetooth), at Block 42.

In addition, the processor 35 designates desired data to be transferred to the electronic device 32, at Block 43. Various types of data may be designated for transfer, such as audio data (e.g., music, podcasts, audiobooks, and ringtones, etc. in various formats such as MP3 files, etc.). Other types of data include image data (e.g., photos and pictures, etc. in various formats such as JPEG, TIFF, GIF, etc.) Other types of data include video data (e.g., MPEG, QuickTime, etc.) Additional types of data include Internet data (e.g., HTML, XML, WAP, URLs, etc.) Further types of data include text or document data (e.g., SMS, MMS, email, word processing files, spreadsheet files, etc.). Another type of data includes contact data. Still another type of data includes PDF files. Yet another type of data includes applications or "apps". A still further type of data includes electronic books. The foregoing are provided as non-limiting examples, and other types of data may be transferred in various embodiments.

Figure 3:
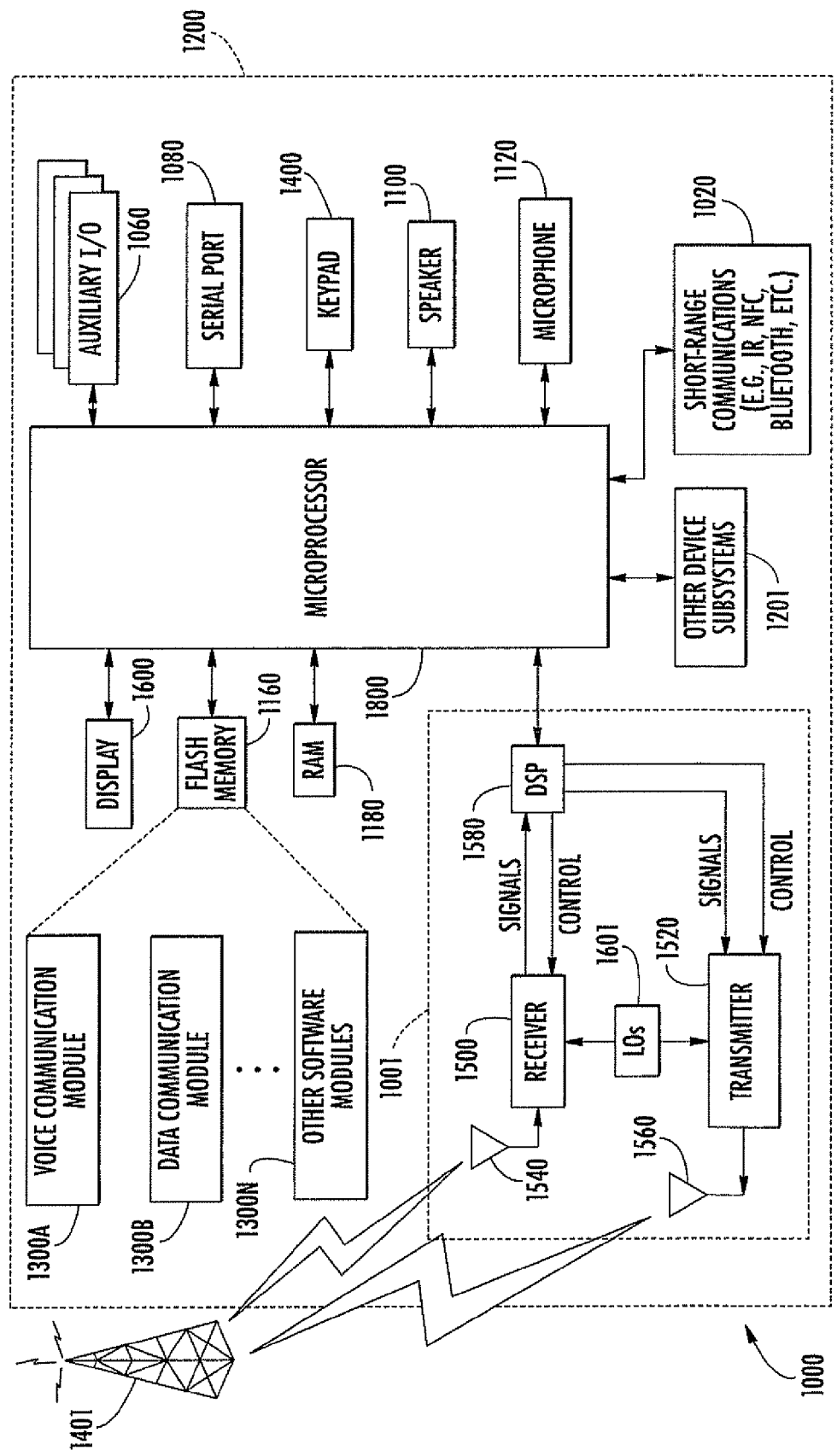
FIG. 3 is a schematic block diagram illustrating example components which may be used in the mobile wireless communications device of FIG. 1.

More particularly, one example approach by which data may be designated for transfer is based upon what is being output on an output device of the mobile wireless communications device 32 (e.g., such as the display 1600 shown in FIG. 3). That is, in the case of a display, if an Internet browser is open and displaying a Web page on the display, then a markup language file for the page (or a URL for the page) may be designated as the data to be transferred. This selection process may be similar for images. For example, a photo (e.g., a JPEG file) may be selected from a photo library or file menu displayed on the display, and the selected photo may be the data designated for transfer. In another example, a video (e.g., an MPEG file) may be selected (or played) on the display from a video library or file menu, and the selected video file may be the data designated for transfer. In still another example, a song (e.g., an MP3 file) may be selected from a song library or file menu shown on the display for playing on a music player application, and the song file corresponding to the displayed indicia may be the data designated for transfer. Another approach for designating data to be transferred is through an on-screen menu selection, such as a file manager application.

Furthermore, the processor 35 may also determine whether the designated data complies with the above-noted NFC transfer parameter, at Block 44. If the designated data does comply with the NFC transfer parameter, then the designated data is transferred to the electronic device 32 via the previously established NFC link, at Block 45. Otherwise, the processor 35 is configured to use the separate wireless communications link based upon the other wireless communications format (e.g., Bluetooth) for transferring the designated data, at Block 46, which concludes the method illustrated in FIG. 2 (Block 47). For example, the connection data may comprise Bluetooth pairing data (e.g., Bluetooth identification numbers or PINs, etc.). It should be noted that various steps illustrated in FIG. 2 may be performed in different orders in certain embodiments. For example, the NFC link may be established after the data to be transferred is designated and its compliance with the NFC transfer parameter is determined. Moreover, the connection data may be exchanged after it is determined that the designated data does not comply with the NFC transfer parameter. That is, in such instances where the designated data may otherwise be transferred adequately using NFC, then the step of exchanging connection data for establishing a separate Bluetooth, etc., connection may be omitted.

By way of example, the NFC transfer parameter may correspond to a size of the designated data, or a content type (e.g., file type, etc.) of the designated data. So, for example, if the designated data exceeds a size threshold, or if the designated data is of a particular file type (e.g., MPEG, PDF, etc.), then the processor 35 may determine that the designated data should not be transferred via an NFC communications link established (either automatically or manually) when the mobile wireless communications device 31 and electronic device 32 are in proximity with one another (i.e., within NFC communications range), at Block 42. For example, the typical data transfer rate of NFC is a few hundred Kbit/s, as compared to that of Bluetooth where the data transfer rate may exceed two Mbit/s. Accordingly, it may not be desirable to transfer relatively large data files (or files of a certain type(s)) using NFC, while smaller files or data types (e.g., Web addresses or URLs, text files, etc.) may be transferred effectively via NFC without establishing or using a separate Bluetooth or other wireless communications link.

In accordance with one example use case, the mobile wireless communications device 31 and electronic device 32 are tapped or otherwise brought into proximity with one another to establish an NFC communications link therebetween. Data that is being displayed may be designated for transfer and, if the data does not comply with the NFC transfer parameter(s), the connection information or data (e.g., Bluetooth pairing data) is exchanged or shared via the NFC link. A prompt may be provided on the display to verify the designated data transfer, if desired, and the Bluetooth (or other) connection may then be established for sending the designated data. This may be done in the background (e.g., without user involvement), and thus appear as if the designated data transfer occurred with the initial NFC communication, although the designated data may continue to be transferred even after the mobile wireless communications device 31 and electronic device 32 are no longer within NFC communication range.

In particular, by sending relevant connection data via the initial NFC link, this connection data may then be used, even at a later time (e.g., within a few minutes), to establish the longer range or higher bandwidth link (e.g., Bluetooth) to transfer the designated data. In addition to the advantage of a higher data transfer rate for larger files, the above-noted approach may also obviate the necessity of having to maintain two paired NFC devices in close proximity for an extended period of time. That is, it may be cumbersome, time-consuming, or awkward for two users to hold their devices close to each other during transfer of a large file. Moreover, this approach may further advantageously provide a seamless user interaction for data transfer.

This approach may also advantageously help avoid data transfer interruptions where the mobile wireless communications device 31 and electronic device 32 are moved relatively quickly in-and-out of NFC communication range, as the data transfer may still be performed using the longer range or higher bandwidth communications format. That is, the connection data may be used at a later time to both improve user interaction and allow data transfer to continue via a secondary transfer if the initial NFC connection is broken. For example, the mobile wireless communications device 31 may be sending a file that complies with the NFC transfer parameter because it is under a size threshold (i.e., small enough for NFC transfer), but during the transfer the mobile wireless communications device and the electronic device 32 are moved apart and the transfer interrupted. In such case, another connection (e.g., Bluetooth) may advantageously be seamlessly established to continue the transfer.

In accordance with another advantageous aspect, the mobile wireless communications device 31 and electronic device 32 may also "wake up" or activate the Bluetooth, etc., communications circuitry upon exchanging the connection data, to advantageously provide enhanced battery power savings. Further, the NFC circuitry or Bluetooth, etc., circuitry may also be powered down or returned to a sleep or low power mode upon completion of the data transfer for additional battery power savings. In some embodiments, the processor 35 may also detect the availability of a given or active secondary wireless communications format available for the electronic device, and select an appropriate wireless communications format based thereon. For example, the processor 35 may detect that the electronic device 32 has a WiFi connection enabled, but its Bluetooth connection disabled, and therefore exchange connection data for a WiFi connection for communication therebetween rather than Bluetooth connection data.

Example components of a mobile device 1000 that may further be used in accordance with the above-described embodiments are now described with reference to FIG. 3. The device 1000 illustratively includes a housing 1200, a keypad or keyboard 1400 and an output device 1600. The output device shown is a display 1600, which may comprise a full graphic LCD. Other types of output devices may alternatively be utilized. A processing device 1800 is contained within the housing 1200 and is coupled between the keyboard 1400 and the display 1600. The processing device 1800 controls the operation of the display 1600, as well as the overall operation of the mobile device 1000, in response to actuation of keys on the keyboard 1400.

The housing 1200 may be elongated vertically, or may take on other sizes and shapes (including clamshell housing structures). The keyboard may include a mode selection key, or other hardware or software for switching between text entry and telephony entry.

In addition to the processing device 1800, other parts of the mobile device 1000 are shown schematically in FIG. 3. These include a communications subsystem 1001; a short-range communications subsystem 1020; the keyboard 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keyboard 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem 1020 may include an infrared device and associated circuits and components, NFC or a Bluetooth™ communications module to provide for communication with similarly-enabled systems and devices.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A communications system comprising:
a plurality of electronic devices each configured to wirelessly communicate via a near-field communication (NFC) format and at least one other wireless communications format;
wherein a first electronic device of the plurality of electronic devices has an NFC transfer parameter associated therewith, wherein the NFC transfer parameter comprises a data security threshold,
wherein the first electronic device performs operations comprising:
establishing an NFC link with a second electronic device of the plurality of electronic devices when in proximity therewith;
presenting output data via an output device coupled to the first electronic device, wherein the output data is associated with indicia of the output data;
identifying the indicia of the output data based on the presenting of the output data via the output device;
designating the indicia of the output data to obtain designated data to be transferred to the second electronic device responsive to the presenting of the output data via the output device, wherein a data security level of a plurality of data security levels is associated with the designated data, allowing for a determination whether the designated data is compliant with the NFC transfer parameter, based on the data security threshold associated with the designated data exceeding the data security level;
based on the determination being that the designated data is compliant with the NFC transfer parameter, transferring at least some of the designated data to the second electronic device via the NFC link, and
based on the determination being that the designated data fails to comply with the NFC transfer parameter:
exchanging connection data over the NFC link for establishing a separate wireless communications link with the second electronic device using the at least one other wireless communication format; and
establishing the separate wireless communications link with the second electronic device based upon the connection data and transfer at least some of the designated data to the second electronic device over the separate wireless communications link using the at least one other wireless communications format.

2. The communications system of claim 1 wherein the operations further comprise:
determining whether the designated data is compliant with the NFC transfer parameter based upon a size of the designated data; and
presenting a prompt via the first electronic device based on the designated data, wherein the transferring of the at least some of the designated data to the second electronic device via one of the NFC link, the separate wireless communications link or both is further based on a response to the prompt received via the first electronic device.

3. The communications system of claim 1 wherein the designated data has a given content type associated therewith from among a plurality of different content types, and wherein the operations further comprise determining whether the designated data is compliant with the NFC transfer parameter based upon the given content type of the designated data.

4. The communications system of claim 1 wherein the at least one other wireless communications format comprises a Bluetooth format, wherein the operations further comprise:
detecting an interruption of the transferring of a first portion of the at least some of the designated data to the second electronic device via the NFC link;
responsive to the detecting of the interruption:
establishing the separate wireless communications link with the second electronic device using the at least one other wireless communication format; and
transferring a second portion of the at least some of the designated data to the second electronic device over the separate wireless communications link using the at least one other wireless communications format.

5. The communications system of claim 1 wherein the output device comprises a display device, wherein the presenting of the output data comprises displaying the output data via the display device, and wherein the designated data is designated based upon the displaying of the output data via the display device.

6. The communications system of claim 1 wherein the designated data comprises at least one of audio data, image data, video data, markup language data, Internet address data, text data, contact data, calendar data, or message data.

7. The communications system of claim 1 wherein the first electronic device comprises a mobile wireless communications device and, wherein the plurality of data security levels comprises a public security level, a confidential security level and a strictly confidential security level, wherein the output data comprises a Web page, and wherein the indicia of the output data comprises a uniform resource locator (URL).

8. A mobile wireless communications device for use with an electronic device configured to wirelessly communicate via a near-field communication (NFC) format and at least one other wireless communications format, the mobile wireless communications device comprising:
an NFC transceiver;
a wireless communications transceiver configured to communicate using the at least one other wireless communications format; and
a processing system including a processor coupled to the NFC transceiver and the wireless communications transceiver, wherein the processor facilitates performance of operations comprising:

facilitating presentation of output data via an output device coupled to the mobile wireless communications device, wherein the output data is associated with indicia of the output data;

facilitating identification of the indicia of the output data based on the presentation of the output data via the output device;

designating the indicia of the output data to obtain designated data to be transferred to the electronic device responsive to the presentation of the output data via the output device;

causing the NFC transceiver to establish an NFC link with the electronic device when in proximity therewith, wherein a data security level of a plurality of data security levels is associated with the designated data, allowing for a determination whether the designated data is compliant with an NFC transfer parameter comprising a data security threshold, wherein compliance of the designated data with the NFC transfer parameter is based on the data security threshold exceeding the data security level;

based on the determination being that the designated data is compliant with the NFC transfer parameter, transferring at least some of the designated data to the electronic device via the NFC link, and based on the determination being that the designated data fails to comply with the NFC transfer parameter:
  exchanging connection data over the NFC link for establishing a separate wireless communications link with the electronic device using the at least one other wireless communication format; and
  establishing the separate wireless communications link with the electronic device based upon the connection data and transfer at least some of the designated data to the electronic device over the separate wireless communications link using the at least one other wireless communications format.

9. The mobile wireless communications device of claim 8 wherein the operations further comprise:
  determining whether the designated data is compliant with the NFC transfer parameter based upon a size of the designated data; and
  presenting a prompt via the mobile wireless communications device responsive to the designating of the indicia of the output data, wherein the transferring of the at least some of the designated data to the electronic device via one of the NFC link or the separate wireless communications link is further based on a response to the prompt received via the mobile wireless communications device.

10. The mobile wireless communications device of claim 8 wherein the designated data has a given content type associated therewith from among a plurality of different content types, and wherein the operations further comprise determining whether the designated data is compliant with the NFC transfer parameter based upon the given content type of the designated data.

11. The mobile wireless communications device of claim 8 wherein the at least one other wireless communications format comprises a Bluetooth format.

12. The mobile wireless communications device of claim 8 wherein the output device comprises an audio output device coupled to the processor, and wherein the data is based upon the presentation of the output data via the audio output device.

13. A communications method for a first electronic device from among a plurality of different electronic devices each configured to wirelessly communicate via a near-field communication (NFC) format and at least one other wireless communications format, the method comprising:
  facilitating a presentation of output data via an output device coupled to the first electronic device, wherein the output data is associated with indicia of the output data;
  facilitating identification of the indicia of the output data based on the presentation of the output data via the output device;
  designating the indicia of the output data to obtain designated data to be transferred to a second electronic device based on the presentation of the output data via the output device;
  establishing an NFC link between with the second electronic device from among the plurality of different electronic devices when in proximity therewith wherein a data security level of a plurality of data security levels is associated with the designated data, the first electronic device having an NFC transfer parameter associated therewith, and determining, at the first electronic device, whether the designated data is compliant with the NFC transfer parameter comprising a data security threshold, wherein compliance of the designated data with the NFC transfer parameter is based on the data security threshold exceeding the data security level;
  based on the determination being that the designated data is compliant with the NFC transfer parameter, transferring at least some of the designated data from the first electronic device to the second electronic device via the NFC link; and
  based on the determination being that the designated data fails to comply with the NFC transfer parameter:
    exchanging connection data over the NFC link for establishing a separate wireless communications link with the second electronic device using the at least one other wireless communications format; and
    establishing the separate wireless communications link with the second electronic device based upon the exchanging of the connection data and transferring at least some of the designated data to the second electronic device over the separate wireless communications link.

14. The method of claim 13 wherein determining comprises determining whether the designated data is compliant with the NFC transfer parameter based upon a size of the designated data.

15. The method of claim 13 wherein the designated data has a given content type associated therewith from among a plurality of different content types, and wherein determining comprises determining whether the designated data is compliant with the NFC transfer parameter based upon the given content type of the designated data.

16. The method of claim 13 wherein the at least one other wireless communications format comprises a Bluetooth format.

17. A non-transitory, machine-readable medium for a mobile wireless communications device comprising a near-field communication (NFC) transceiver and a wireless communications transceiver configured to communicate using at least one other wireless communications format, the machine-readable medium having executable instructions that when executed on a processing system of the mobile wireless communications device, facilitate performance of operations, comprising:

facilitating presentation of output data via an output device coupled to the mobile wireless communications device, wherein the output data is associated with indicia of the output data;

facilitating identification of the indicia of the output data based on the presentation of the output data via the output device;

designating the indicia of the output data to obtain designated data to be transferred to an electronic device based on the presentation of the output data via the output device;

causing the NFC transceiver to establish an NFC link with the electronic device also configured to communicate via NFC and the at least one other wireless communications format when in proximity therewith, wherein a data security level of a plurality of data security levels is associated with the designated data, allowing for a determination whether the designated data is compliant with an NFC transfer parameter comprising a data security threshold, wherein compliance of the designated data with the NFC transfer parameter is based on the data security threshold exceeding the data security level;

based on the determination being that the designated data is compliant with the NFC transfer parameter, transferring the designated data to the electronic device via the NFC link; and based on the determination being that the designated data fails to comply with the NFC transfer parameter:

exchanging connection data over the NFC link for establishing a separate wireless communications link with the electronic device using the at least one other wireless communications format; and establishing the separate wireless communications link with the electronic device based upon the exchanging of the connection data and transferring at least some of the designated data to the electronic device over the separate wireless communications link with the electronic device using the at least one other wireless communications format.

18. The non-transitory, machine-readable medium of claim 17 wherein determining comprises determining whether the designated data is compliant with the NFC transfer parameter based upon a size of the designated data.

19. The non-transitory, machine-readable medium of claim 17 wherein the data has a given content type associated therewith from among a plurality of different content types, and wherein determining comprises determining whether the designated data is compliant with the NFC transfer parameter based upon the given content type of the designated data.

20. The non-transitory, machine-readable medium of claim 17 wherein the at least one other wireless communications format comprises a Bluetooth format.

21. The communications system of claim 1 wherein one of the first electronic device, the second electronic device or both comprises wireless communication circuitry supporting the at least one other wireless communications format, wherein the wireless communication circuitry is configured to wake-up from a low power state responsive to the exchanging of the connection data over the NFC link.

22. The communications system of claim 21 wherein the wireless communication circuitry is configured to return to the low power state upon completion of a transfer of the designated data.

23. The communications system of claim 22 wherein the designated data comprises a uniform resource locator of a web page being output on the output device.

24. The communications system of claim 22 wherein the designated data comprises a mark-up language file associated with a web page being output on the output device.

\* \* \* \* \*